(12) United States Patent
Kim et al.

(10) Patent No.: US 11,145,875 B2
(45) Date of Patent: Oct. 12, 2021

(54) FUEL CELL ELECTRODE CATALYST LAYER COATING

(71) Applicant: Robert Bosch GmbH, Stuttgart (DE)

(72) Inventors: Soo Kim, Cambridge, MA (US); Jonathan Mailoa, Cambridge, MA (US); Mordechai Kornbluth, Brighton, MA (US); Yelena Gorlin, Menlo Park, CA (US); Georgy Samsonidze, San Francisco, CA (US); Boris Kozinsky, Waban, MA (US); Nathan Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 16/544,511

(22) Filed: Aug. 19, 2019

(65) Prior Publication Data

US 2021/0057760 A1   Feb. 25, 2021

(51) Int. Cl.
*H01M 4/92*   (2006.01)
*H01M 8/1018*   (2016.01)

(52) U.S. Cl.
CPC .... *H01M 4/926* (2013.01); *H01M 2008/1095* (2013.01)

(58) Field of Classification Search
CPC .............. H01M 4/926; H01M 2008/1095
See application file for complete search history.

(56) References Cited

U.S. PATENT DOCUMENTS

| 8,979,978 | B2 * | 3/2015 | Miller | B01D 71/021 |
| | | | | 95/47 |
| 9,680,158 | B2 | 6/2017 | Huang et al. | |
| 10,038,200 | B2 | 7/2018 | Kim et al. | |
| 10,050,278 | B2 * | 8/2018 | Yom | H01M 4/8642 |
| 10,886,540 | B2 * | 1/2021 | Xie | H01M 4/926 |

(Continued)

FOREIGN PATENT DOCUMENTS

| KR | 101675494 B1 | 11/2016 |
| WO | 2012114108 A1 | 8/2012 |
| WO | 2018231998 A1 | 12/2018 |

OTHER PUBLICATIONS

M. Karuppannan, Y. Kim, S. Gok, E Lee, J. Y. Hwang, J.-H. Jang, Y.-H. Cho, T. Lim, Y.-E. Sung and O. J. Kwon. "A highly durable carbon-nanofiber-supported Pt-C core-shell cathode catalyst for ultra-low Pt loading proton exchange membrane fuel cells: facile carbon encapsulation," Energy & Environmental Science, vol. 12, p. 2820, 2019, 10 pages.

(Continued)

*Primary Examiner* — Amanda C. Walke
(74) *Attorney, Agent, or Firm* — Brooks Kushman P.C.

(57) ABSTRACT

A fuel cell first and second electrode catalyst layers and a polymer electrolyte membrane (PEM) situated therebetween. A graphene-based material coated onto a first and/or second surface of the first and/or second electrode catalyst layers. The graphene-based material has a number of defects including a number of quad-vacancy (QV) defects formed by a vacancy of four adjacent carbon atoms in the graphene-based material. The number of QV defects are configured to mitigate dissolution of the first and/or second catalyst materials through the first and/or second surface of the first and/or second electrode catalyst layers.

20 Claims, 4 Drawing Sheets

(56) References Cited

U.S. PATENT DOCUMENTS

| | | | |
|---|---|---|---|
| 2012/0021131 A1* | 1/2012 | Borsting | B29C 70/54 427/401 |
| 2012/0149897 A1 | 6/2012 | Jeon et al. | |
| 2013/0252138 A1* | 9/2013 | Zhou | H01M 4/926 429/524 |
| 2015/0247258 A1* | 9/2015 | Diankov | H01M 4/925 117/106 |
| 2016/0093891 A1* | 3/2016 | Rehman | H01M 4/8652 429/486 |
| 2016/0251765 A1 | 9/2016 | Botte | |
| 2017/0040082 A1* | 2/2017 | Swett | C01B 32/00 |
| 2017/0065939 A1* | 3/2017 | Kim | B01D 67/0072 |
| 2017/0092960 A1* | 3/2017 | Serov | H01M 8/0234 |
| 2017/0170487 A1 | 6/2017 | Xie et al. | |
| 2017/0194656 A1* | 7/2017 | Sinsabaugh | H01M 8/20 |
| 2017/0296982 A1* | 10/2017 | Swett | B01D 71/021 |
| 2018/0062181 A1* | 3/2018 | Gath | H01M 4/8817 |
| 2018/0123140 A1 | 5/2018 | Dai | |
| 2018/0244524 A1* | 8/2018 | Ozyilmaz | C12N 5/0602 |
| 2018/0311624 A1* | 11/2018 | Lozada | B01D 69/12 |
| 2018/0337411 A1* | 11/2018 | Ozyilmaz | H01M 8/1023 |
| 2020/0127300 A1* | 4/2020 | Prinz | H01M 4/8657 |
| 2020/0147590 A1* | 5/2020 | Imai | B01J 23/75 |
| 2020/0153004 A1* | 5/2020 | Oh | H01M 8/04149 |

OTHER PUBLICATIONS

L. Wang, Z. Sofer, and M. Pumera. "Will any crap we put into graphene increase its electrocatalytic effect?," ACS Nano, vol. 14, No. 1, p. 21, 2020, 5 pages.
Jaber-Ansari et al., "Suppressing Manganese Dissolution from Lithium Manganese Oxide Spinel Cathodes with Single-Layer Graphene", Adv. Energy Mater. 2015, 5, 1500646, DOI: 10.1002/aenm.201500646, 10 pages.
Gasteiger et al., "Activity benchmarks and requirements for Pt, Pt-alloy, and non-Pt oxygen reduction catalysts for PEMFCs", Nov. 5, 2004, New York, 27 pages.
Schwammlein et al., "Anode Aging during PEMFC Start-Up and Shut-Down: H2-Air Fronts vs Voltage Cycles", Journal of the Electrochemical Society, Dec. 19, 2018, Germany, 11 pages.
Fampiou et al., "Binding of Pt Nanoclusters to Point Defects in Graphene: Adsorption, Morphology, and Electronic Structure", The Journal of Physical Chemistry, Feb. 26, 2012, Massachusetts, 13 pages.
Chen et al., "Comprehensive Enhancement of Nanostructured Lithium-Ion Batter Cathode Materials via Conformal Graphene Dispersion", Nano Letters, Feb. 27, 2017, Illinois, 8 pages.
Zaton et al., "Current understanding of chemical degradation mechanisms of perfluorosulfonic acid membranes and their mitigation strategies: a review", Royal Society of Chemistry, Mar. 13, 2017, France, 30 pages.
Groger et al., "Review—Electromobility: Batteries or Fuel Cells?", Journal of the Electrochemical Society, Oct. 9, 2015, Germany, 19 pages.
Wood et al., "First-Principles-Inspired Design Strategies for Graphene-Based Supercapacitor Electrodes" The Journal of Physical Chemistry, Dec. 13, 2013, California, 12 pages.
Niaei et al., "Hydrogenated defective graphene as an anode material for sodium and calcium ion batteries: A density functional theory study", Carbon, Apr. 18, 2018, Australia, 12 pages.
Dasgupta et al., "Atomic Layer Deposition of Platinum Catalysts on Nanowire Surfaces for Photoelectrochemical Water Reduction", Journal of the American Chemical Society, Aug. 20, 2013, California, 4 pages.
Chao et al., "Nanostructured Platinum Catalysts by Atomic-Layer Deposition for Solid-Oxide Fuel Cells", Advanced Energy Materials, May 15, 2012, California, 4 pages.
An et al., "Ultra-thin platinum catalytic electrodes fabricated by atomic layer deposition", Phys. Chem. Chem. Phys., Mar. 7, 2013, California, 6 pages.
Wu et al., "Core-shell graphene@amorphous carbon composites supported platinum catalysts for oxygen reduction reaction", Chinese Journal of Catalysis, Apr. 20, 2015, China, 6 pages.
T.X. Wu, G.Z. Wang, X. Zhang, C. Chen, Y.X. Zhang, and H.J. Zhao, "Transforming chitosan into N-doped graphitic carbon electrocatalysts," Chemical Communications, vol. 51, p. 1334, 2015, 4 pages.
J. Ying, G. Jiang, Z.P. Cano, L. Han, X.-Y. Yang, and Z. Chen, "Nitrogen-doped hollow porous carbon polyhedrons embedded with highly dispersed Pt nanoparticles as a highly efficient and stable hydrogen evolution electrocatalyst," Nano Energy, vol. 40, p. 88, 2017, 7 pages.
Z. Yan, H. Jin, and J. Guo. "Low-temperature synthesis of graphitic carbon-coated silicon anode materials," Carbon Energy, vol. 1, p. 246, 2019, 7 pages.
J.P. Paraknowitsch, J. Zhang, D. Su, A. Thomas, and M. Antonietti. "Ionic liquids as precursors for nitrogen-doped graphitic carbon," Advanced Materials, vol. 22, p. 87, 2010, 6 pages.
Zhang et al., "Tuning the Electrocatalytic Performance of Ionic Liquid Modified Pt Catalysts for the Oxygen Reduction Reaction via Cationic Chain Engineering", ACS Catal. 2018, 8, 8244-8254, 11 pages.
Aritonang et al., "Synthesis of Platinum Nanoparticles from K2PtCl4 Solution Using Bacterial Cellulose Matrix", Research Article, vol. 2014, Article ID 285954, 7 pages.
Liu et al., "In situ one-step synthesis of metal-organic framework encapsulated naked Pt nanoparticles without additional reductants", . Mater. Chem. A, 2015, 3, 8028, 6 pages.
Afsahi et al., "Electrocatalyst synthesized from metal organic frameworks", Journal of Power Sources 239 (2013), 9 pages.
Adlim et al., "Synthesis of chitosan-stabilized platinum and palladium nanoparticles and their hydrogenation activity", Journal of Molecular Catalysis A: Chemical 212 (2004), 9 pages.

* cited by examiner

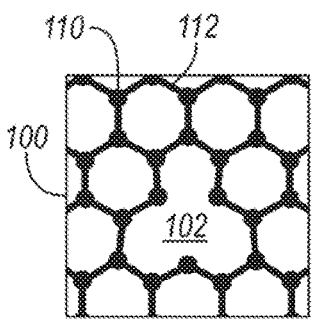 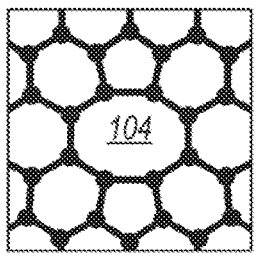 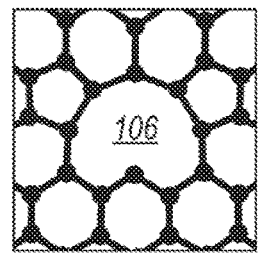 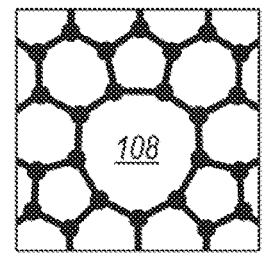
FIG. 3A　　　FIG. 3B　　　FIG. 3C　　　FIG. 3D
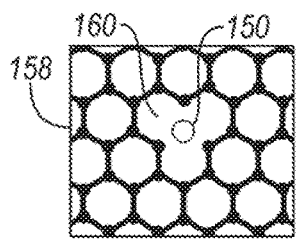 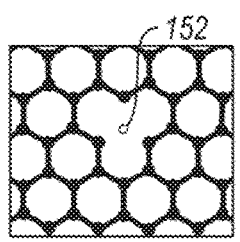 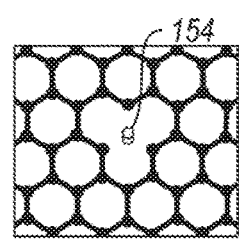 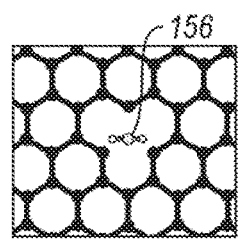
FIG. 4A　　　FIG. 4C　　　FIG. 4E　　　FIG. 4G
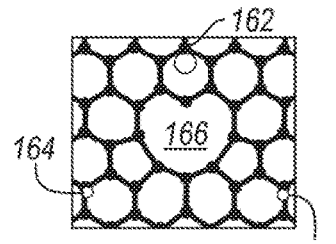 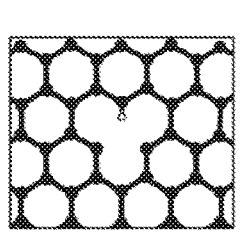 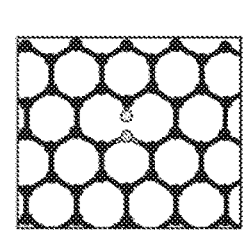 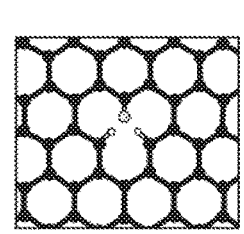
FIG. 4B　　　FIG. 4D　　　FIG. 4F　　　FIG. 4H
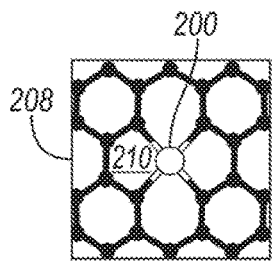 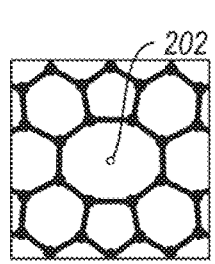 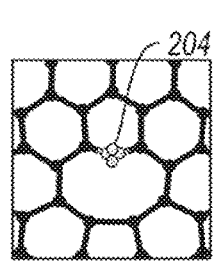 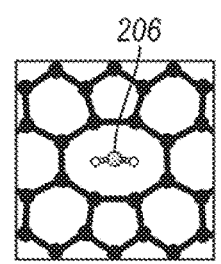
FIG. 5A　　　FIG. 5B　　　FIG. 5C　　　FIG. 5D
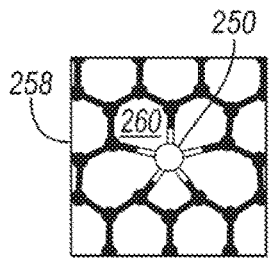 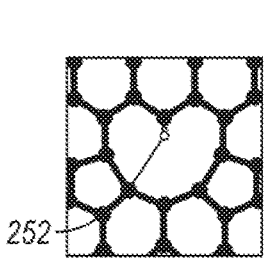 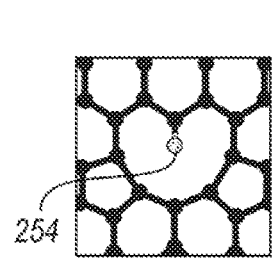 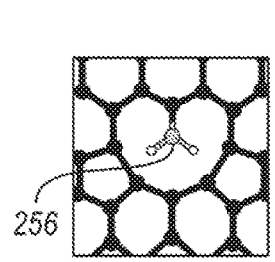
FIG. 6A　　　FIG. 6B　　　FIG. 6C　　　FIG. 6D

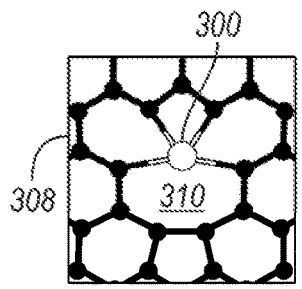
FIG. 7A
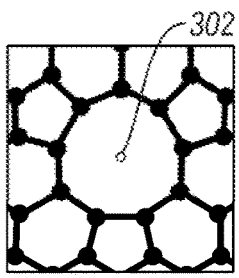
FIG. 7B
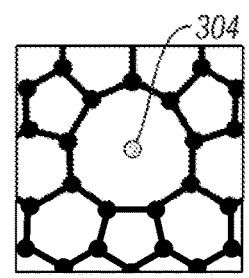
FIG. 7C
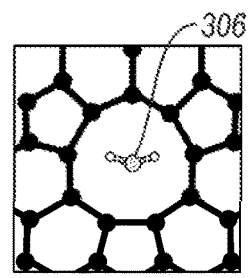
FIG. 7D
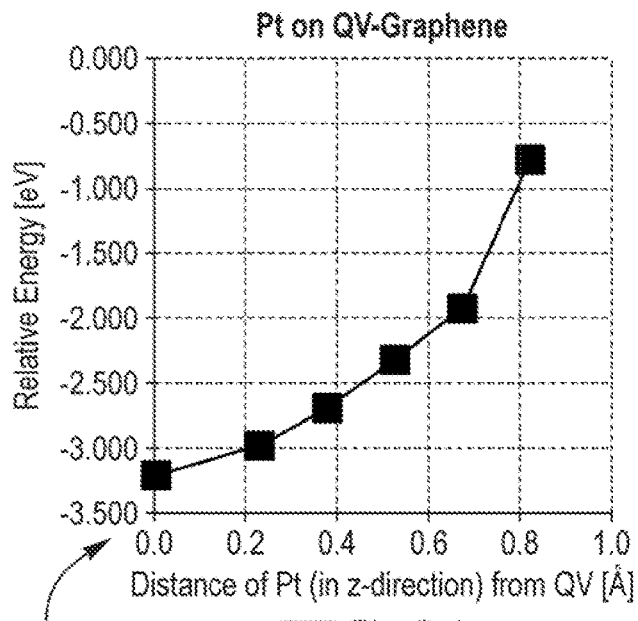
FIG. 8A
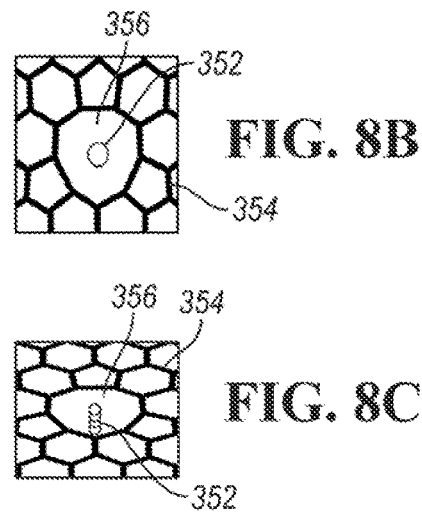
FIG. 8B
FIG. 8C
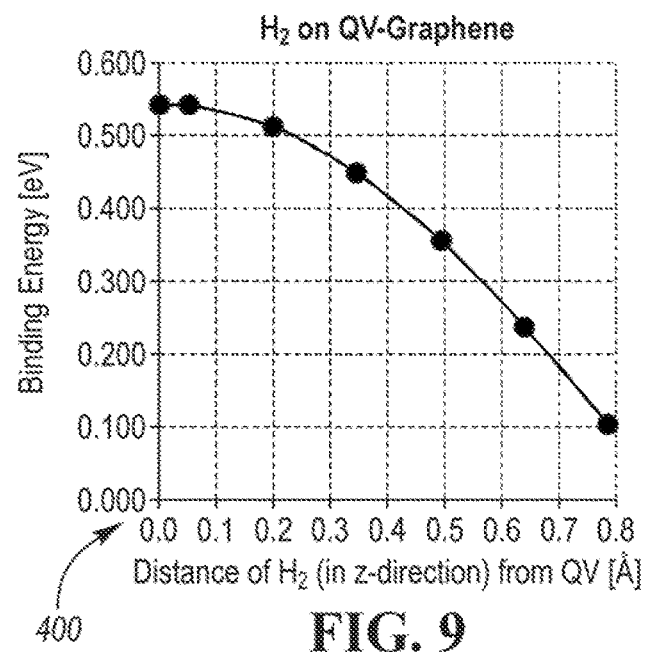
FIG. 9

US 11,145,875 B2

FUEL CELL ELECTRODE CATALYST LAYER COATING

TECHNICAL FIELD

The present disclosure relates to a defective two-dimensional material (e.g., a graphene-based material) coated onto the surface a fuel cell electrode catalyst layer configured to mitigate catalyst dissolution while maintaining transportability of fuel cell reactants and products.

BACKGROUND

Fuel cells have shown promise as an alternative power source for vehicles and other transportation applications. Fuel cells operate with a renewable energy carrier, such as, hydrogen. Fuel cells also operate without toxic emissions or greenhouse gases. An individual fuel cell includes a membrane electrode assembly (MEA) and two flow field plates. An individual fuel cell typically delivers 0.5 to 1.0 V, which is typically too low for vehicle and transportation applications. Individual fuel cells can be stacked together to form a fuel cell stack having higher voltage and power. Due to the relatively high costs of the materials in the fuel cell stack, fuel cell technology has seen limited adoption. One of the materials that contributes significantly to the overall cost of the fuel cell stack is the catalyst material, such as platinum catalyst materials. The durability of the catalyst materials has an impact on the overall cost of fuel cell technology.

SUMMARY

According to one embodiment, a fuel cell is disclosed. The fuel cell includes a polymer electrolyte membrane (PEM) and first and second electrode catalyst layers including first and second catalyst materials. The PEM is situated between the first and second electrode catalyst layers. The first electrode catalyst layer has a first surface facing away from the PEM and a second surface facing the PEM. The second electrode catalyst layer has a first surface facing away from the PEM and a second surface facing the PEM. The fuel cell further includes a graphene-based material coated onto the first and/or second surface of the first and/or second electrode catalyst layer. The graphene-based material has a number of defects. Each defect is formed by a vacancy of at least four adjacent carbon atoms in the graphene-based material. The number of defects is configured to mitigate dissolution of the first and/or second catalyst materials through the first and/or second surface of the first and/or second electrode catalyst layers.

According to another embodiment, a fuel cell is disclosed. The fuel cell includes a polymer electrolyte membrane (PEM) and first and second electrode catalyst layers including first and second catalyst materials. The PEM is situated between the first and second electrode catalyst layers. The first electrode catalyst layer has a first surface facing away from the PEM and a second surface facing the PEM. The second electrode catalyst layer has a first surface facing away from the PEM and a second surface facing the PEM. The fuel cell further includes a two-dimensional layered material coated onto the first and/or second surface of the first and/or second electrode catalyst layers. The two-dimensional layered material has a number of defects. Each defect is formed by a vacancy of at least four adjacent carbon atoms in the two-dimensional layered material. The number of defects is configured to mitigate dissolution of the first and/or second catalyst materials through the first and/or second surface of the first and/or second electrode catalyst layers.

According to yet another embodiment, a fuel cell is disclosed. The fuel cell includes a polymer electrolyte membrane (PEM) and first and second electrode catalyst layers including first and second catalyst materials. The PEM is situated between the first and second electrode catalyst layers. The first electrode catalyst layer has a first surface facing away from the PEM and a second surface facing the PEM. The second electrode catalyst layer has a first surface facing away from the PEM and a second surface facing the PEM. The fuel cell includes a graphene-based material coated onto the first and/or second surface of the first and/or second electrode catalyst layers. The graphene-based material has a number of defects. The number of defects includes a number of quad-vacancy (QV) defects formed by a vacancy of four adjacent carbon atoms in the graphene-based material. The number of defects also includes a number of smaller defects formed by a vacancy of three or less adjacent carbon atoms. The number of defects also includes and a number of larger defects formed by a vacancy of five or more adjacent carbon atoms. The number of QV defects is configured to mitigate dissolution of the first and/or second catalyst materials through the first and/or second surface of the first and/or second electrode catalyst layers. The number of small defects is configured to transport $H_2$ through the graphene-based material. The number of larger defects is configured to transport $H_2$, $O_2$ and $H_2O$ through the graphene-based material.

BRIEF DESCRIPTION OF THE DRAWINGS

FIGS. 3a through 3d depict schematic views of a defective graphene sheet including a mono-vacancy (MV), a di-vacancy (DV), a tri-vacancy (TV) and a quad-vacancy (QV), respectively.

FIGS. 4a through 4h depict schematic views of the atomic structures of different adsorbate species (e.g., Pt, $H_2$, $O_2$, and $H_2O$) interacting with a MV in a graphene sheet.

FIGS. 5a through 5d depict schematic views of the atomic structures of different adsorbate species (e.g., Pt, $H_2$, $O_2$, and $H_2O$) interacting with a DV in a graphene sheet.

FIGS. 6a through 6d depict schematic views of the atomic structures of different adsorbate species (e.g., Pt, $H_2$, $O_2$, and $H_2O$) interacting with a TV in a graphene sheet.

FIGS. 7a through 7d depict schematic views of the atomic structures of different adsorbate species (e.g., Pt, $H_2$, $O_2$, and $H_2O$) interacting with a QV in a graphene sheet.

FIG. 8a shows a graph of the relative energy change when Pt moves away from a QV in a z-direction.

FIG. 8b shows a schematic top view of Pt atomic structures at different distances from a graphene sheet including a QV.

FIG. 8c shows a schematic side view of Pt atomic structures at different distances from a graphene sheet including a QV.

FIG. 9 includes a graph plotting relative energy (eV) as a function of distance of $H_2$ (in z-direction) from a QV (Å) for $H_2$ on a graphene sheet having the QV.

DETAILED DESCRIPTION

Figure 1:
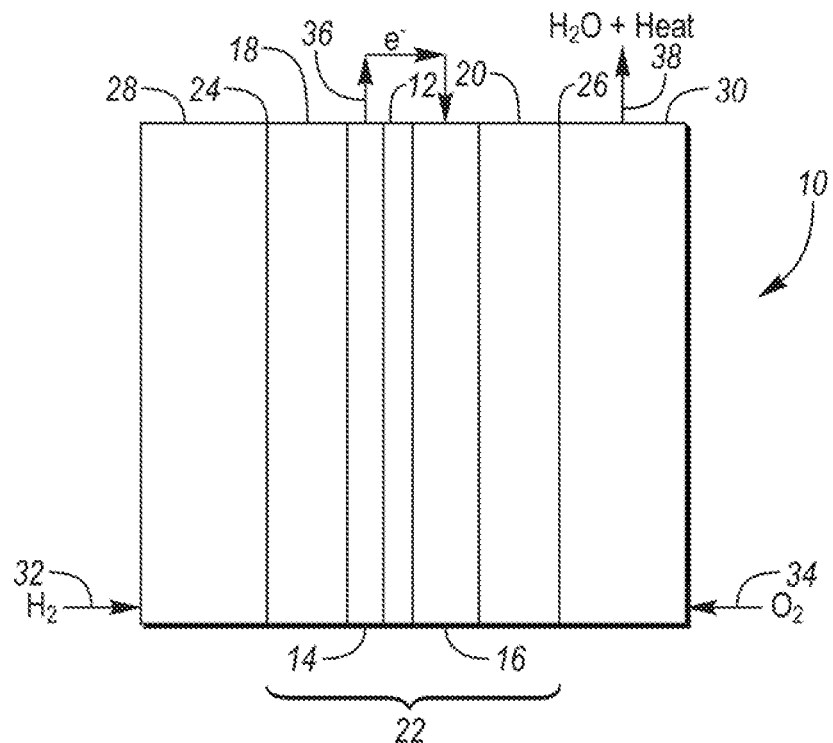
FIG. 1 is a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell. A fuel cell uses oxygen from air and compressed hydrogen as fuel sources, while only emitting water and heat. The widespread adoption of fuel cells would reduce carbon dioxide emissions. However, widespread adoption requires further technological development. One area for further technological development is improvement of the durability of the catalyst materials in the fuel cell.

Catalyst materials are included in a catalyst layer of an anode and a cathode of a fuel cell. Platinum catalysts are commonly used as the catalyst materials for the anode and/or cathode. Platinum catalysts are subject to dissolution and migration of $Pt^{2+}$ ions from the catalyst layer to other components in the fuel cell, such as the polymer electrolyte membrane (PEM). What is needed is a solution to reduce dissolution and to slow down migration while maintaining the beneficial catalytic activity of the platinum catalyst. Aspects of the present disclosure are directed to the use of defective graphene-based materials as part of the catalyst layer to increase the durability, e.g. reduce dissolution and slow down migration, of catalyst materials. Aspects of the present disclosure use hybrid graphene-catalyst systems via controlling atomic and molecular interfaces to suppress metal dissolution of catalysts in PEM fuel cell environments. The use of defective graphene-based materials preserves electrochemical surface active area (ESCA) and/or mitigates PEM degradation, thereby extending the lifetime of the fuel cell stack for a given catalyst material loading.

FIG. 1 depicts a schematic view of fuel cell 10. Fuel cell 10 can be stacked to create a fuel cell stack. Fuel cell 10 includes polymer electrolyte membrane (PEM) 12, anode catalyst layer (CL) 14, cathode catalyst layer (CL) 16 and first and second gas diffusion layers (GDLs) 18 and 20. PEM 12 is situated between anode CL 14 and cathode CL 16. Anode CL 14 is situated between first GDL 18 and PEM 12 and cathode CL is situated between second GDL 18 and PEM 12. PEM 12, anode CL 14, cathode CL 16 and first and second GDLs 18 and 20 comprise membrane electrode assembly 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode CL 14 and cathode CL 16. The catalyst material is commonly the most expensive constituent of MEA 22.

At anode CL 14, the catalyst material catalyzes a hydrogen oxidation reaction (HOR) ($H_2 \rightarrow 2H^+ + 2e^-$), which creates a flow of electrons through conduit 36 (e.g., wire). At cathode CL 16, the catalyst material catalyzes an oxygen reduction reaction (ORR) ($\frac{1}{2}O_2 + 2H^+ + 2e^- \rightarrow H_2O$), wherein the electrons are supplied from conduit 36. The $H_2O$ from the ORR (and heat) exit fuel cell 10 through second flow field 30, as represented by arrow 38. The loading of the catalyst material in cathode CL 16 is higher than the loading in anode CL 14 because the kinetics of the ORR are significantly slower than the kinetics of the HOR. A loading of anode CL 14 as low as 0.025 $mg_{pt}/cm^2$ may result in kinetic losses of less than or equal to 20 mV for the HOR. A loading of cathode CL 16 of 0.1, 0.2, 0.3 or 0.4 $mg_{pt}/cm^2$ may result in kinetic losses of greater than or equal to 400 mV.

During the operation of fuel cell 10, the catalyst material may undergo degradation at anode CL 14 and cathode CL 16, resulting in an increase in kinetic overpotentials experienced by fuel cell 10 over time. A variety of phenomena may result in degradation of a catalyst material in a fuel cell. Catalyst loading variations in cathode CL 16 during operation of fuel cell 10 may result in changes in cathode potential, for example, a change of any of the following values or within a range thereof: 0.7, 0.8, 0.9 and 0.95 V. This level of cathode potential change may lead to degradation of the catalyst material in cathode CL 16. Start-up and shut-down effects or local fuel starvation effects may lead to degradation of the catalyst material in anode CL 14. Because substantial reduction in catalyst material loading may significantly help reach cost targets for fuel cell 10, identifying systems, structures and methods for reducing catalyst material degradation would help satisfy beginning-of-life (BOL) and end-of-life (EOL) performance metrics.

A main degradation pathway for Pt associated with both degradation phenomena identified above is dissolution of Pt to form $Pt^{2+}_{(aq.)}$ ions. This dissolution leads to loss in active electrode area and subsequent reduction in ORR activity. Furthermore, the generated $Pt^{2+}_{(aq.)}$ ions dissolve and subsequently migrate towards PEM 12, which may increase the probability of hydrogen peroxide production, and potentially accelerate degradation of PEM 12. Therefore, being able to control the dissolution of Pt from either pure Pt or Pt-based catalysts (and, dissolution of any other transition metals in Pt-M alloys) or other catalyst materials disclosed herein is beneficial to suppressing long-term degradation of fuel cell 10.

In one embodiment, first-principles density functional theory (DFT) algorithms, calculations and/or methodologies are used to model atomic-scale interactions of graphene with fuel cell reactants ($H_2$ and $O_2$) and products ($H_2O$) and catalyst materials (Pt). These algorithms, calculations and/or methodologies demonstrate that defective graphene can be used as a selective diffusion barrier for Pt in comparison to other species present that are necessary to diffuse through fuel cell 10. Accordingly, as set forth herein, structures for incorporating defective graphene into cathode CL 16 and/or an anode CL 14 are disclosed to enhance the durability of MEA 22 and to enable the reduction of Pt loadings. The use of defective graphene with vacancies can significantly enhance the weak binding energies in pristine graphene. Non-limiting examples of graphene vacancies include mono-vacancy (MV), di-vacancy (DV) and Stone-Wales (SW) defects. Non-limiting examples of methods for producing such defects include synthetic methods, annealing processes and ion bombardment. Further, removal of more carbon atoms (e.g., creating larger vacancies) may be accomplished to rearrange the defective graphene structure.

Figure 2:
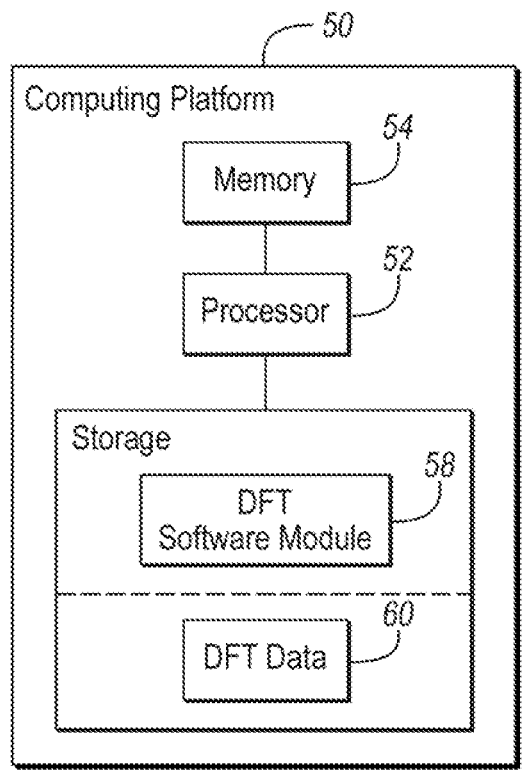
FIG. 2 is a schematic diagram of a computing platform that may be utilized to implement DFT algorithms, calculations and/or methodologies of one or more embodiments.

The DFT algorithms, calculations and/or methodologies of one or more embodiments are implemented using a computer platform, such as the computing platform 50 illustrated in FIG. 2. The computing platform 50 may include a processor 52, memory 54, and non-volatile storage 56. The processor 52 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid state device, cloud storage or any other device capable of persistently storing information.

Processor 52 may be configured to read into memory 54 and execute computer-executable instructions residing in DFT software module 58 of the non-volatile storage 56 and embodying DFT slab model algorithms, calculations and/or methodologies of one or more embodiments. Software module 58 may include operating systems and applications. Software module 58 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 52, the computer-executable instructions of the DFT software module 58 may cause the computing platform 50 to implement one or more of the DFT algorithms and/or methodologies disclosed herein. Non-volatile storage 56 may also include DFT data 60 supporting the functions, features, calculations, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

As generated by DFT software module 58, FIGS. 3a through 3d depict schematic views of defective graphene sheet 100 including mono-vacancy (MV) 102, di-vacancy (DV) 104, tri-vacancy (TV) 106 and quad-vacancy (QV) 108, respectively. Carbon atoms 110 are represented by circles and bonds 112 between carbon atoms 110 are represented by lines. MV 102 is formed by removing a single carbon atom from a pristine graphene sheet. DV 104 is formed by removing two adjacent carbon atoms from a pristine graphene sheet. TV 106 is formed by removing three adjacent carbon atoms from a pristine graphene sheet. QV 108 is formed by removing four adjacent carbon atoms from a pristine graphene sheet.

The DFT calculations were performed using a Perdew-Burke-Eenzerhof (PBE) formulation of a generalized gradient approximation with a projected augmented wave method to structurally relax graphene to form defective graphene sheet 100. The DFT calculations using the PBE formulation may be implemented using the Vienna ab initio simulation package (VASP). In one embodiment, an energy cutoff for the plane-wave basis is set to 520 eV. A k-point per reciprocal atoms (KPPRA) value can be any of the following values or in a range of any two of the following values: 1,000, 1,500, 2,000, 2,500, 3,000, 3,500 and 4,000. The KPPRA value can vary depending on supercell size.

An energy penalty in eV per carbon atom associated with creating a graphene defect as compared to a pristine graphene sheet may be calculated. The energy penalty in eV/carbon for creating graphene sheet vacancies can be determined using the following equation (1):

$$E_{penalty} = [(E_{0,final} + n \times \mu_C) - E_{0,graphene}]/n \quad (1)$$

where $E_0$ is DFT internal energy from the calculations, n is number of vacancies, and $\mu_C$ is the chemical potential of carbon (−9.217 eV).

Table 1 below shows the energy penalty in eV for MV, DV, TV and QV.

|  | MV | DV | TV | QV |
|---|---|---|---|---|
| Energy Penalty | 6.310 | 1.811 | 2.353 | 1.249 |

According to this data, MVs are the most difficult to form of the four phases identified in Table 1. Additionally, the high-energy MV phase is very reactive with other species, e.g., hydrogen atoms. For these reasons, DVs are preferred over MVs. TVs are slightly higher in terms of energy penalty than DVs, but are still more stable than MVs. Based on the energy penalty data of Table 1, QVs are the most stable among the graphene defects of Table 1.

As generated by DFT software module 58 using DFT calculations, the reactivity of a defective graphene species (e.g., MV, DV, TV and QV) with Pt, $H_2$, $O_2$ and $H_2O$ are tested and determined. The reactivity may be measured by reaction enthalpy (eV). Equation (2) can be used to determine reaction enthalpy.

$$\Delta E_{rxn} = E_{0,final,adsorbed} - (\mu_{adsorbate} + E_{0,defected\_graphene}) \quad (2)$$

where $E_0$ is the calculated DFT internal energy of the atomic structure before and after the adsorption and $\mu_{adsorbate}$ is the chemical potential of different adsorbate species (e.g., Pt, $H_2$, $O_2$, and $H_2O$). In one embodiment, the chemical potentials used are as follows: Pt (−6.097 eV), $H_2$ (−6.762 eV), $O_2$ (−9.046 eV), and $H_2O$ (−14.886 eV). In this embodiment, $\mu_{Pt}$ is the DFT bulk energy of Pt metal, $\mu_{H2}$ is the DFT energy of $H_2$ gas, $\mu_{O2}$ is the DFT energy of $O_2$ gas, and $\mu_{H2O}$ is the DFT energy of bulk $H_2O$ (e.g., solid ice). Depending on the choice of chemical potentials used, the relative reaction enthalpy may shift by a constant value. For example, $Pt^{2+}_{(aq.)}$ may involve additional terms such as ionization and solvation corrections. When reaction enthalpy ($\Delta E_{rxn}$) is negative, the corresponding reaction takes place spontaneously, and vice versa.

Table 2 shows the chemical reactivities using Equation (2).

| Reaction Enthalpy (eV) | Pt | $H_2$ | $O_2$ | $H_2O$ |
|---|---|---|---|---|
| MV | +22.871 | −2.078 | −5.013 | −0.751 |
| DV | +4.599 | +4.321 | +0.102 | +3.291 |
| TV | +0.550 | −3.557 | +0.870 | +0.916 |
| QV | +4.385 | +0.541 | +4.895 | +1.597 |

FIGS. 4a through 4h depict schematic views showing the atomic structures of different adsorbate species (e.g., Pt, $H_2$, $O_2$ and $H_2O$) before and after adsorption onto graphene sheet 158 including MV 160. FIGS. 4a, 4c, 4e and 4g show Pt atomic structure 150, $H_2$ atomic structure 152, $O_2$ atomic structure 154 and $H_2O$ atomic structure 156 placed onto MV 160 of graphene sheet 158 before a structural relaxation using DFT calculations. In FIG. 4b, Pt atomic structure 150 has moved away from MV 160 of graphene sheet 158 and has attached to carbon site 162. Moreover, two extra carbon atoms 164 have attached to other carbon rings, thereby making MV 160 of FIG. 4a into TV 166, as shown in FIG. 4b. As can be seen in Table 2, this reaction is highly endothermic (+22.871 eV), and therefore, this reaction is unlikely to occur. In the cases of $H_2$ atomic structure 152, $O_2$ atomic structure 154 and $H_2O$ atomic structure 156, the $H_2$ atomic structure 152, $O_2$ atomic structure 154 and $H_2O$ atomic structure 156 of FIGS. 4c, 4e and 4g dissociate around MV 160, as shown in FIGS. 4d, 4f and 4h. As suggested by the chemical reactivities of Table 2, these dissociation reactions occur spontaneously. As suggested by Table 1, the MV may be rarely observed due to the calculated energy penalty of greater than 6 eV.

FIGS. 5a through 5d depict schematic view of the atomic structures of different adsorbate species (e.g., Pt, $H_2$, $O_2$ and $H_2O$) after adsorption onto graphene sheet 208 having DV 210. FIGS. 5a, 5b, 5c and 5d show Pt atomic structure 200, $H_2$ atomic structure 202, $O_2$ atomic structure 204 and $H_2O$ atomic structure 206 placed onto graphene sheet 208 having DV 210. As shown in FIGS. 5a, 5b and 5d, Pt atomic structure 200, $H_2$ atomic structure 202 and $H_2O$ atomic structure 206, respectively, are stable (e.g., do not dissociate) when placed onto graphene sheet 208 having DV 210. As shown in FIG. 5c, $O_2$ atomic structure 204 dissociates onto the carbon ring of graphene sheet 208. Since the DFT calculations suggest that $O_2$ atomic structure 204 reacts with DV 210 in graphene sheet 208, this defective graphene sheet may not be desirable for oxygen gas to diffuse through the DV. Moreover, all the DFT calculated reaction enthalpies in Table 2 are found to be positive numbers for the case of DV, meaning that a certain amount of energies is required for these reactions to take place.

FIGS. 6a through 6d depict schematic view of the atomic structures of different adsorbate species (e.g., Pt, $H_2$, $O_2$ and $H_2O$) after adsorption onto graphene sheet 258 having DV 260. FIGS. 6a, 6b, 6c and 6d show Pt atomic structure 250, $H_2$ atomic structure 252, $O_2$ atomic structure 254 and $H_2O$ atomic structure 256 placed onto graphene sheet 258 having TV 260. As shown in FIGS. 6b and 6c, $H_2$ atomic structure 252 and $O_2$ atomic structure 254 each dissociates onto a carbon in graphene sheet 258 having TV 260. Accordingly, in one or more embodiments, graphene sheet 258 having TV 260 may not be desirable for hydrogen and oxygen gaseous species to diffuse through the TV. The reaction enthalpy of the TV and $H_2$ is very negative (−3.557 eV), meaning that this type of reaction occurs spontaneously.

FIGS. 7a through 7d depict schematic view of the atomic structures of different adsorbate species (e.g., Pt, $H_2$, $O_2$ and $H_2O$) after adsorption onto graphene sheet 308 having QV 310. FIGS. 7a, 7b, 7c and 7d show Pt atomic structure 300, $H_2$ atomic structure 302, $O_2$ atomic structure 304 and $H_2O$ atomic structure 306 placed onto graphene sheet 308 having QV 310. As shown in FIGS. 7b, 7c and 7d, $H_2$ atomic structure 302, $O_2$ atomic structure 304 and $H_2O$ atomic structure 306, respectively, do not dissociate onto graphene sheet 308 having QV 310. Moreover, the DFT calculated reaction enthalpies for QV in Table 2 are positive numbers, meaning that it requires a certain amount of energies for these dissociation reactions to take place. Accordingly, this means that the likelihood of dissociation $H_2$ atomic structure 302, $O_2$ atomic structure 304 and $H_2O$ atomic structure 306 is low. As shown in FIG. 7a, Pt atomic structure 300 in a dissolved form is captured by QV. In other embodiments, catalyst materials other than Pt may be captured by a QV. For instance, the QV may capture a Pt-M catalyst, where M is a transition metal such as Co, Fe or Ni. The captured Pt on the QV may still act as a catalyst material since Pt is in contact with a graphene-based material, which is a conductor. Less Pt migrates toward PEM 12, thereby reducing electrochemical surface active area (ECSA) loss. Since less Pt is redeposited on PEM 12, then less PEM 12 degradation results. Preventing ECSA loss and PEM degradation may increase the lifetime of fuel cell 10. During a negative sweep, Pt on graphene defects may be ionized, released and redeposited within anode CL 14 and/or cathode CL 16 of fuel cell 10.

Relative energy changes when different adsorbate species (e.g., Pt, $H_2$, $O_2$ and $H_2O$) are placed relatively near or away from a QV are examined using DFT calculations. These calculations are used to simulate various environments within fuel cell 10. FIG. 8a shows a graph of the relative energy change when Pt moves away from the QV in a z-direction. FIG. 8a includes graph 350 plotting relative energy (eV) as a function of distance of Pt (in z-direction) from QV (Å) for Pt on a graphene sheet having a QV. As shown in FIG. 8a, there is a strong binding energy (>−3.0 eV) of Pt to the QV near the graphene sheet. FIG. 8b shows a schematic top view of Pt atomic structures 352 at different distances from graphene sheet 354 including QV 356. FIG. 8c shows a schematic side view of Pt atomic structures 352 at different distances from graphene sheet 354 including QV 356.

The relative energy of 0 eV indicates Pt placed in a vacuum far away from a graphene sheet. In this embodiment, a distance of 0.7 Å between the graphene sheet and Pt is used, although other distances, such as, 0.5, 0.6, 0.8, 0.9 and 1.0 Å can be used. It is observed that the relative energy becomes more negative as the Pt moves closer to the QV in the defected graphene sheet. This observation may be based on the following analysis. If Pt is released from the catalyst layer and travels away from anode CL 14 and/or cathode CL 16 of fuel cell 10, introducing a defected graphene sheet with QV attracts the Pt atom, sitting on the middle of QV as depicted in FIG. 7a. A large thermodynamic driving force for Pt to move toward QV in defective graphene exists, as explained by the greater than 3 eV difference shown in FIG. 8. In one embodiment, a defective graphene sheet with QV defects is incorporated as coating on a surface of anode CL 14 and/or cathode CL 16 of fuel cell 10, thereby Pt dissolution may be hindered by the Pt adsorption in the QV. If Pt is not released toward PEM 12, then polymer degradation can be suppressed or slowed down. Because graphene is also a conductor, Pt sitting on the QV may still act as a catalyst (i.e., less ECSA loss, even if Pt is release from the main catalyst layer). Moreover, the adsorbed Pt may be ionized to $Pt^{2+}$ and released during the negative sweep of potentials, and possibly then re-deposit with other Pt metals in anode CL 14 and/or cathode CL 16.

While mitigation of Pt degradation by introduction of graphene defects is beneficial, the reactants (e.g., hydrogen and oxygen gas) and the product (e.g., formed water) need to be effectively transported to and away from a graphene-coated catalyst layer (e.g., from and to the gas diffusion layer). FIG. 9 shows the relative energy of $H_2$ moving away from the QV in the z-direction. FIG. 9 includes graph 400 plotting relative energy (eV) as a function of distance of $H_2$ (in z-direction) from a QV (Å) for $H_2$ on a graphene sheet having the QV. The relative energy of 0 eV is when $H_2$ is placed in a vacuum far away from the graphene sheet. As compared with Pt of FIG. 8, the opposite phenomenon for $H_2$ is observed in FIG. 9. The DFT calculations in FIG. 9 indicate that $H_2$ binds less strongly (e.g., more positive binding energy), as moving from vacuum toward the QV. This indicates that in order for $H_2$ to go through the QV, it needs an energy penalty of at least ~0.5 eV. Since fuel cell 10 operates within this voltage window, the $H_2$ diffuses through the QV if the operating voltage is greater than 0.5 V. In another scenario (<0.5 eV), $H_2$ molecules may feel a repulsive force when approaching QV, therefore, it moves away from the QV.

Figure 10A:
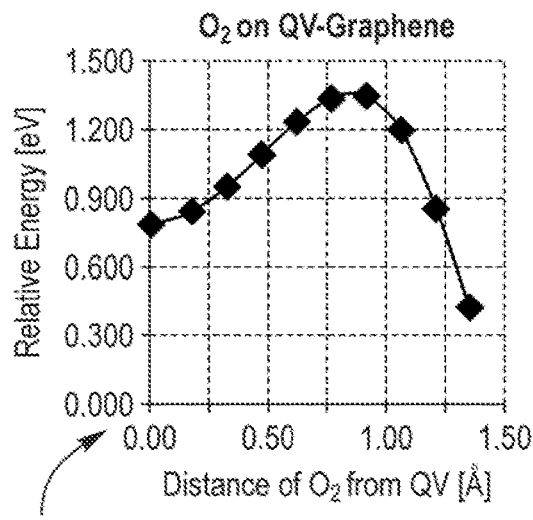
FIG. 10a includes a graph plotting relative energy (eV) as a function of distance of $O_2$ (in z-direction) from a QV (Å) for $O_2$ on a graphene sheet having the QV.
Figure 10B:
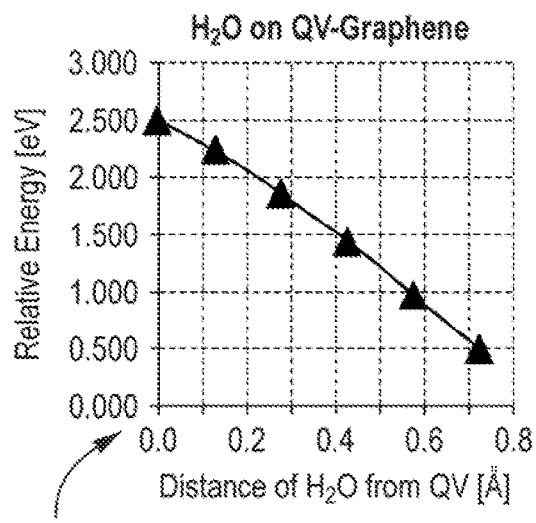
FIG. 10b includes a graph plotting relative energy (eV) as a function of distance of $H_2O$ (in z-direction) from a QV (Å) for $H_2O$ on a graphene sheet having the QV.

FIG. 10a shows the relative energy of $O_2$ moving away from the QV in the z-direction. FIG. 10a includes graph 450 plotting relative energy (eV) as a function of distance of $O_2$ (in z-direction) from a QV (Å) for $O_2$ on a graphene sheet having the QV. FIG. 10b shows the relative energy of $H_2O$ moving away from the QV in the z-direction. FIG. 10b includes graph 452 plotting relative energy (eV) as a function of distance of $H_2O$ (in z-direction) from a QV (Å) for $H_2O$ on a graphene sheet having the QV. As $O_2$ approaches the graphene QV, it feels a repulsive force up to ~1.4 eV (when $O_2$ is 0.8 Å away). Similarly, $H_2O$ feels an energy barrier up to ~2.5 eV, when approaching the QV in graphene. A typical operating regime of fuel cell 10 is from 0.6 to 0.9 V. The DFT calculation results indicate that it is difficult for $O_2$ and $H_2O$ to diffuse through QV in graphene. In other words, it may be more favorable for $O_2$ and $H_2O$ to go around the QV, when to be transported from the electrode to other fuel cell components (e.g., membrane, gas channel, etc.). Unlike $H_2$, in order for $O_2$ and $H_2O$ to go through the QV, the energy penalties are relatively large, up to ~1.4 and ~2.5 eV, respectively. This indicates that even if fuel cell 10 operates up to ~1 V, it may not be feasible for $O_2$ and $H_2O$ to diffuse through the QV (e.g., not enough thermodynamic driving force). These species may endure a very high repulsive force when approaching QV, and, therefore, move away from the QV.

Accordingly, in one or more embodiments, graphene defects, such as QV, are introduced to mitigate Pt degradation and to facilitate oxygen and water transport from and to the electrodes. In one embodiment, a graphene sheet is populated with defects of four (4), or more adjacent carbon atoms (e.g., QVs). The greater number of adjacent carbon atoms omitted to create the defect may be any of the following numbers or in a range of any two of the numbers: 5, 6, 7, 8, 9, 10, 12, 14, 16, 18, 20 and 25. Based on the DFT calculations herein, QV may allow some $H_2$ transport depending on the operating voltage. However, the DFT calculations also suggest that $O_2$ and $H_2O$ transports through the QV may be more difficult.

Figure 11:
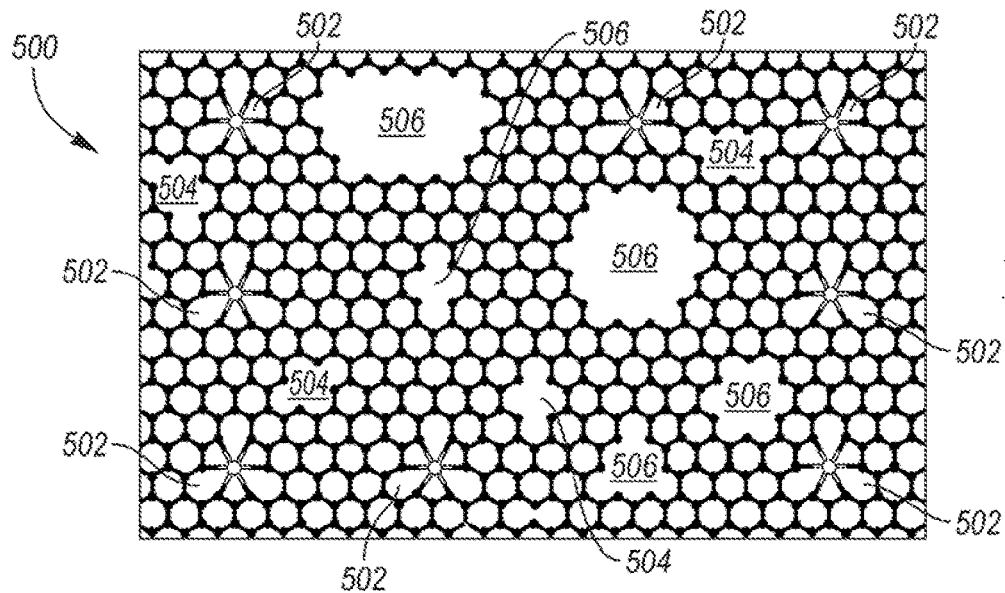
FIG. 11 is a schematic view showing a chemical structure of a graphene sheet with various defects.

FIG. 11 is a schematic view showing a chemical structure of graphene sheet 500 with various defects. Graphene sheet 500 includes a number of QVs 502. The number of QVs 502 may be configured to capture dissolved Pt. Graphene sheet 500 includes a number of defects 504 that are smaller than QVs (e.g., MVs, DVs and TVs). The number of smaller defects 504 may be configured to selectively allow $H_2$ transport through graphene sheet 500, while not allowing $O_2$ and $H_2O$ transport through graphene sheet 500. Graphene sheet 500 includes a number of defects 506 that are larger than QVs. The number of defects 506 may be formed by wrinkling of graphene sheet 500. The number of larger defects 506 may be configured to allow $H_2$, $O_2$ and $H_2O$ transport through graphene sheet 500. Based on the DFT calculations, during lateral diffusion of Pt in the xy-direction, Pt is attracted to one of the number of QVs 502, which captures the Pt, as shown in FIG. 11. Accordingly, Pt diffusion is relatively slow due to the attractive force toward the number of QVs 502. Therefore, escape of Pt ions through the number of larger defects is mitigated compared to the transport of $H_2$, $O_2$ and $H_2O$.

A graphene-based material used as a surface coating for anode CL 14 and/or cathode CL 16 may include a number of smaller defects (e.g., smaller than QV), a number of QV defects, and a number of larger defects (e.g., larger than QV) per unit volume. The number of smaller defects per unit volume of the graphene-based material may be any of the following values or in a range of any two of the following values: 0, 0.5, 1.0, 1.5, 2.0, 2.5 and 3.0%. The number of QV defects per unit volume of the graphene-based material may be any of the following values or in a range of any two of the following values: 0, 0.5, 1.0, 1.5, 2.0, 2.5, 3.0, 3.5, 4.0, 4.5 and 5.0%. The number of larger defects per unit volume of the graphene-based material may be any of the following values or in a range of any two of the following values: 0, 0.5, 1.0, 1.5, 2.0, 2.5, 3.0, 3.5, 4.0, 4.5, 5.0, 5.5 and 6.0%. The ratio of smaller defects to QV defects to larger defects per unit volume may any of the following ratios or in a range of any two of the following ratios: 0:0:0, 3:5:6 and 1:1:1.

Figure 12:
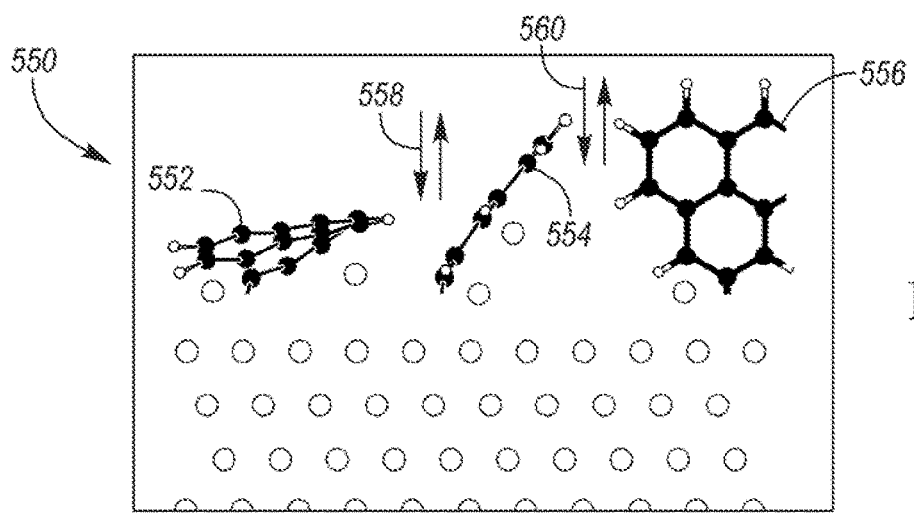
FIG. 12 is a schematic view of a catalyst layer surface including wrapped defective graphene material islands.

In another embodiment, a graphene material having beneficial defects may be wrapped onto a surface of anode CL 14 and/or cathode CL 16 to form a geometry different than a planar geometry of a continuous graphene sheet. FIG. 12 is a schematic view of catalyst layer surface 550 including wrapped defective graphene material islands 552, 554 and 556. In one embodiment, graphene nanoflakes (GNF) may be dispersed within a catalyst material ink. The catalyst material and GNF may be mixed in a slurry containing ethyl cellulose. For example, the slurry may be prepared with 70, 10, 10 and 10 wt % Pt catalyst, nano-GNF, ethyl cellulose and ionomer, respectively, in a liquid solvent. Ultra-sonication may be performed to dispense the particles and to prevent aggregation of the nanoparticles. The slurry sample may be casted, dried, and subsequently assembled as an electrode for fuel cell 10.

As shown by arrows 558 and 560 in FIG. 12, $H_2$, $O_2$ and $H_2O$ are transported between wrapped defective graphene material islands 552, 554 and 556, while dissolved Pt ions are captured by graphene defects. The attractive and repulsive forces with Pt, $H_2$, $O_2$ and $H_2O$ may be further tuned by including different types of hydrogen (—H) and oxygen function groups (e.g., —O—, =O, —OH, and/or —COOH) in the graphene sheet, by forming either reduced graphene oxide (rGO) or graphene oxide (GO). The percentage of hydrogenated functionalized groups (—H) in the graphene-based material may be any of the following values or in a range of any two of the following values: 0, 5, 10, 15, 20, 25 and 30%. The percentage of oxygenated functionalized groups (e.g., —O—, =O, —OH, and/or —COOH) in the graphene-based material may be any of the following values or in a range of any two of the following values: 0, 5, 10, 15, 20, 25, 30, 25 and 40%.

In one embodiment, a graphene-based material may be coated on a surface of anode CL 14 and/or cathode CL 16, such as the surface of anode CL 14 and/or cathode CL 16 facing away from PEM 12. The surface(s) may be partially or fully coated with the graphene-based material. The catalyst material of anode CL 14 and/or cathode CL 16 may be pure Pt, a Pt-M alloy (where M is another metal from the periodic table), other platinum group members (PGM) metals (e.g., Ru, Rh, Pd, Os or Ir), PGM-M, Pt-PGM-M or combinations thereof. The graphene-based material may be a graphene sheet applied in a planar orientation relative to the coated surface of anode CL 14 and/or cathode CL 16. The graphene-based sheet may include a single monolayer of graphene. In other embodiments, the number of graphene monolayers in the graphene-based sheet may be any of the following numbers or in a range of any two of the following numbers: 2, 3, 4, 5, 6, 7, 8, 9, 10, 11, 12, 13, 14 and 15. The graphene-based material may be configured to mitigate degradation of the catalyst material in anode CL 14 and/or cathode CL 16. Mitigation of Pt degradation may provide one or more of the following benefits: (1) reduce ECSA loss, and (2) prevent $Pt^+$ ion migration to the interface between PEM 12 and anode CL 14 and/or cathode CL 16 or into PEM 12, thereby suppressing PEM degradation. The addition of the graphene-based material may enhance electron transport due to increased conductivity of the catalyst layer. In one embodiment, the coating of the graphene-based material may be in direct contact with the catalyst material in anode CL 14 and/or cathode CL 16. In another embodiment, the coating of the graphene-based materials is loosely bound, e.g., located a short distance from anode CL 14 and/or cathode CL 16. The short distance may be any of the following values or in a range of any two of the following values: 0.5, 1.0, 1.5, 2.0, 2.5 and 3.0 nm. When Pt ionizes to $Pt^{2+}_{(aq.)}$ and dissolves into solution, the graphene-based material coating may capture the dissolved Pt species.

The graphene-based material may be coated onto a surface of anode CL 14 and/or cathode CL 16 using various processes. The graphene-based material may be deposited onto the catalyst material during synthesis of anode CL 14 and/or cathode CL 16, or after fabrication of anode CL 14 and/or cathode CL 16, either in the form of thin film or via dispersion (e.g., using graphene ink). The coated graphene-base material electrode catalyst layer may be produced using solid-state, solution-based or deposition techniques, followed by secondary heat treatment in the presence of oxidizing or reducing agents (e.g., air, $O_2$, $N_2$, Ar, $H_2$ or mixtures thereof). A film of the graphene-based material may be grown on a metal foil using chemical vapor deposition (CVD), followed by cleaning with an organic solvent and electro-polishing with applied voltage with acids. Thereafter, the material may be rinsed and heat-treated in a furnace under a reducing environment (e.g., using Ar:$H_2$ gas mixture) for graphene growth. After the CVD growth, the sample may be combined with a polymer (e.g., poly(methyl methacrylate) (PMMA)), followed by an etching or rinsing process. The composite film may be transferred onto a surface of anode CL 14 and/or cathode CL 16.

The graphene-based material may include graphene, graphene oxide (GO), reduced graphene oxides (rGO) and combinations thereof. The graphene-based material may also include other materials that capture dissolved metal ions in the operation of fuel cell 10. The graphene-based material may contain oxygen functional groups such as epoxy (—O—), carbonyl (=O), carboxylic (—COOH), and/or hydroxyl (—OH) to further optimize the transport and diffusion of Pt, $H_2$, $O_2$, and $H_2O$. In one embodiment, different graphene and graphene oxides can be obtained by Hummer's method. The graphene-based material may include a significant amount of material capable of capturing dissolved metal ions. The significant amount may be any of the following values or in a range of any two of the following values: 70, 75, 80, 85, 90, 95 and 100%. The remaining amounts may partially include an amorphous and/or crystalline graphite material. The graphene-based material may be further functionalized by cation or anion doping. In another embodiment, the graphene-based material may include a carbide material, a nitride material or a fluoride material configured to optimize the selective diffusion of Pt, $H_2$, $O_2$ and $H_2O$. The graphene-based material coating may also present a physical barrier against HF and/or or $SO_3^-$ attack to further prevent PEMFC degradation.

Other two-dimensional layered structured materials may be coated onto a surface of anode CL 14 and/or cathode CL 16 using various processes. Non-limiting examples of other two-dimensional layered structured material include graphyne, borophene, germanene, silicone, $Si_2BN$, stanine, phosphorene, bismuthene, molybdenite, as well as transition metal dichalcogenides (TMDCs) (e.g., $MOS_2$, $WSe_2$, $HfS_2$, etc.), layered transition metal carbides and carbonitrides (MXenes) with a general formula of $M_{n+1}X_nT_x$, where M stands for transition metals (e.g., Ti, Mo, W, Nb, Zr, Hf, V, Cr, Ta, and Sc), X stands for carbon and/or nitrogen, and $T_x$ stands for surface terminations (e.g., =O, —OH or —F), and combinations thereof. Other two-dimensional layered structural materials may be used to replace in whole or in part of the graphene-based materials in the electrode catalyst layer coating.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell comprising:
   a polymer electrolyte membrane (PEM);
   first and second electrode catalyst layers including first and second catalyst materials, the PEM situated between the first and second electrode catalyst layers, the first electrode catalyst layer having a first surface facing away from the PEM and a second surface facing the PEM, and the second electrode catalyst layer having a first surface facing away from the PEM and a second surface facing the PEM; and
   a two-dimensional layered material coated onto the first and/or second surface of the first and/or second electrode catalyst layers, the two-dimensional layered material having a number of defects, each formed by a vacancy of at least four adjacent carbon atoms in the two-dimensional layered material, and the number of defects configured to mitigate dissolution of the first and/or second catalyst materials through the first and/or second surface of the first and/or second electrode catalyst layers, the two-dimensional layer material includes: graphyne, borophene, germanene, silicone, $Si_2BN$, stanine, phosphorene, bismuthene, molybdenite, a transition metal dichalcogenide (TMDC), a layered transition metal carbide or carbonitride with a general formula of $M_{n+1}X_nT_x$, where M is a transition metal, X stands for carbon and/or nitrogen, and $T_x$ is a surface termination of =O, —OH or —F, or a combination thereof, and the two-dimensional layered material further includes a graphene-based material.

2. The fuel cell of claim 1, wherein the two-dimensional layered material is configured to trap the first and/or second catalyst materials within the number of defects.

3. The fuel cell of claim 2, wherein the first and/or second catalyst materials include a Pt-M alloy, wherein M is a non-Pt metal; a platinum group metal (PGM); a PGM-M, wherein M is a non-PGM; a Pt-PGM-M, wherein PGM is a PGM other than Pt and M is a non-PGM; or a combination thereof.

4. The fuel cell of claim 1, wherein the graphene-based material includes one or more oxygen-based functional groups.

5. The fuel cell of claim 1, wherein the number of defects includes a number of quad-vacancy (QV) defects formed by a vacancy of four adjacent carbon atoms in the graphene-based material.

6. The fuel cell of claim 1, wherein the number of defects includes a number of smaller defects formed by a vacancy of three or less adjacent carbon atoms.

7. The fuel cell of claim 1, wherein the number of defects includes a number of larger defects formed by a vacancy of five or more adjacent carbon atoms.

8. The fuel cell of claim 1, wherein the graphene-based material includes one or more hydrogenated groups and/or one or more oxygenated groups.

9. The fuel cell of claim 8, wherein the one or more oxygenated groups include —O—, =O, —OH, and/or —COOH groups.

10. A fuel cell comprising:
a polymer electrolyte membrane (PEM);
first and second electrode catalyst layers including first and second catalyst materials, the PEM situated between the first and second electrode catalyst layers, the first electrode catalyst layer having a first surface facing away from the PEM and a second surface facing the PEM, and the second electrode catalyst layer having a first surface facing away from the PEM and a second surface facing the PEM; and
a graphene-based material coated onto the first and/or second surface of the first and/or second electrode catalyst layers, the graphene-based material having a number of defects, the number of defects including a number of quad-vacancy (QV) defects formed by a vacancy of four adjacent carbon atoms in the graphene-based material, a number of smaller defects formed by a vacancy of three or less adjacent carbon atoms and a number of larger defects formed by a vacancy of five or more adjacent carbon atoms, the number of QV defects configured to mitigate dissolution of the first and/or second catalyst materials through the first and/or second surface of the first and/or second electrode catalyst layers, the number of smaller defects configured to transport $H_2$ through the graphene-based material, and the number of larger defects configured to transport $H_2$, $O_2$ and $H_2O$ through the graphene-based material.

11. The fuel cell of claim 10, wherein a ratio of the number of smaller defects to the number of QV defects to the number of larger defects per unit volume is in a range of 3:5:6 to 1:1:1.

12. The fuel cell of claim 10, wherein the graphene-based material is substantially planar to the first and/or second surface of the first and/or second electrode.

13. The fuel cell of claim 10, wherein the graphene-based material includes one or more hydrogenated groups and/or one or more oxygenated groups.

14. The fuel cell of claim 13, wherein the one or more oxygenated groups include —O—, =O, —OH, and/or COOH groups.

15. The fuel cell of claim 10, wherein the first and/or second catalyst materials include a Pt-M alloy, wherein M is a non-Pt metal; a platinum group metal (PGM), a PGM-M, wherein M is a non-PGM; a Pt-PGM-M, wherein PGM is a PGM other than Pt and M is a non-PGM; or a combination thereof.

16. The fuel cell of claim 10, wherein the graphene-based material includes graphene, graphene oxide, reduced graphene oxides or a combination thereof.

17. The fuel cell of claim 10, wherein the graphene-based material is configured to trap the first and/or second catalyst materials within the number of defects.

18. The fuel cell of claim 10, wherein the graphene-based material includes one or more oxygen-based functional groups.

19. The fuel cell of claim 10, wherein the graphene-based material includes a graphene sheet having a number of graphene layers in a range of 1 to 15.

20. The fuel cell of claim 10, wherein the graphene-based material includes a graphene sheet having a number of graphene layers in a range of 1 to 10.

* * * * *